March 17, 1959   W. C. EWALDSON ET AL   2,877,730
TWIST CORRECTOR UNIT FOR CABLE SHEATHING MACHINES
Filed Dec. 8, 1953   4 Sheets-Sheet 2

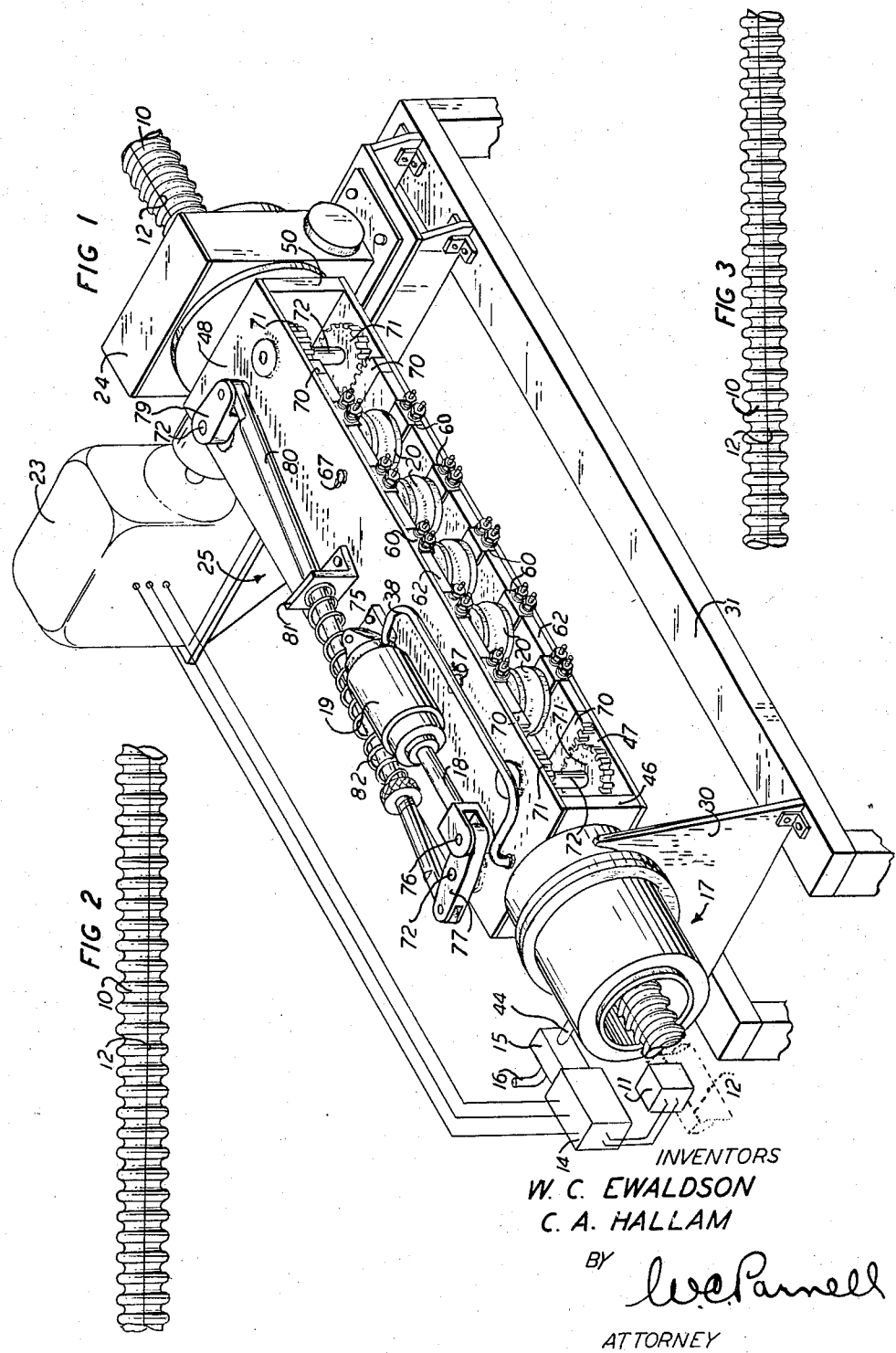

INVENTORS
W. C. EWALDSON
C. A. HALLAM
BY
ATTORNEY

March 17, 1959   W. C. EWALDSON ET AL   2,877,730
TWIST CORRECTOR UNIT FOR CABLE SHEATHING MACHINES
Filed Dec. 8, 1953   4 Sheets-Sheet 3

INVENTORS
W. C. EWALDSON
C. A. HALLAM
BY
ATTORNEY

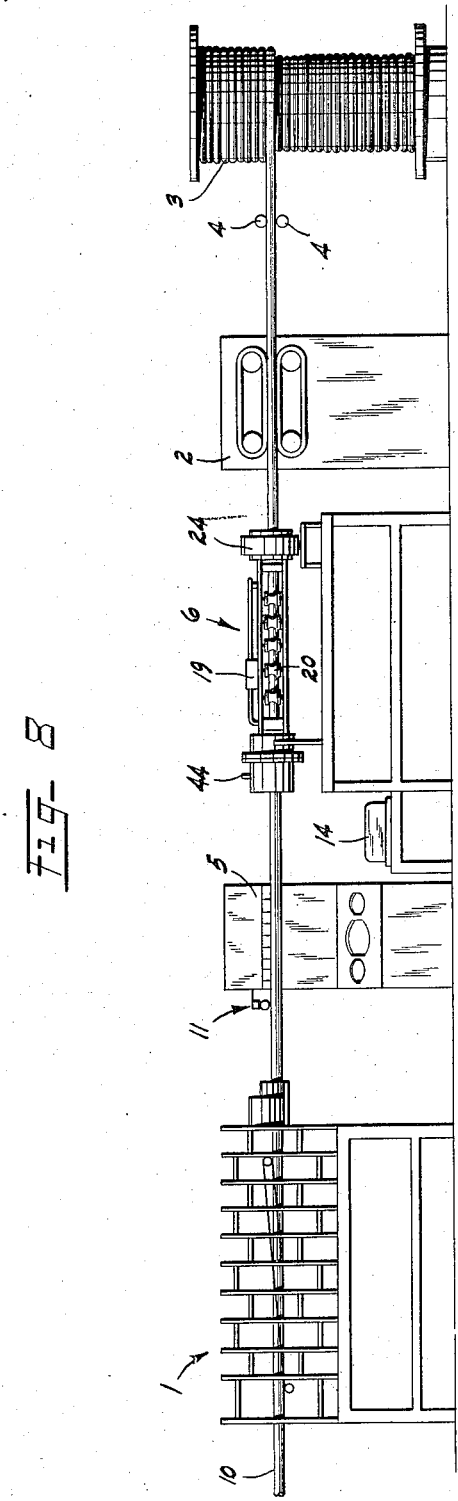

United States Patent Office 2,877,730
Patented Mar. 17, 1959

2,877,730

TWIST CORRECTOR UNIT FOR CABLE SHEATHING MACHINES

Waldemar C. Ewaldson, Millington, and Cecil A. Hallam, Westfield, N. J., assignors to Western Electric Company, Incorporated, New York, N. Y., a corporation of New York Application December 8, 1953, Serial No. 396,946

8 Claims. (Cl. 113—59)

This invention relates to article straightening apparatus and more particularly to apparatus for removing a twist from a longitudinal moving article circular in cross-section.

During the manufacture of tubes with abutting or overlapping longitudinal edges to form seams which are to be soldered or welded, it is important that the tubes be held against twisting during their advancement longitudinally relative to the soldering or welding units.

In the manufacture of tubular sheaths for cable cores from strips of metal having laterally extending corrugations, the longitudinal edges of which are to be overlapped to form a longitudinal seam, it is more important that the tubular sheaths be held against twisting. In tubes or sheaths of this type, the corrugated overlapping edges will remain matched and in interfitting engagement with each other only as long as the seam remains in a straight line parallel with the axis of the tube. Even a very slight deviation of the seam in either direction from the straight line will result in mismatching of the corrugated overlapping edges of the seam, preventing the production of a most efficient soldering or welding of the overlapping edges.

The object of the invention is an apparatus capable of efficiently straightening a longitudinally advancing tubular article free of disturbance to the advancement of the article.

With this and other objects in view, the invention comprises rollers disposed at opposing sides of a longitudinal advancing tubular article and supported for movement relative to each other in a rotatable carriage to grip the tube sufficiently to twist the tube to maintain the overlapping edges of the tube in a straight line.

In the present embodiment of the invention, the article straightening apparatus is responsive to a sensing unit which is the subject matter of the co-pending application of C. A. Hallam and E. W. Reynolds, Serial No. 396,867, filed December 8, 1953 now Patent 2,710,394, and a control unit which is the subject matter of the co-pending application of W. C. Ewaldson, C. A. Hallam and H. C. Slechta, Serial No. 396,884, filed December 8, 1953. In such a system, the deviation of a seam in a tube or sheath from a straight line parallel with the axis of the tube or sheath will cause the sensing unit to start the control unit to function immediately to cause the carriage to rotate in a direction opposing the direction of deviation, of the seam, simultaneously moving pairs of holders through the application of predetermined variable pressure to be translated through sets of flexible rollers, supported by the holders, to the tube or corrugated sheath of a cable core so that the twist may be removed therefrom, returning the seam of the tube or sheath to a straight line.

Other objects and advantages will be apparent from the following detailed description when considered in conjunction with the accompanying drawings, wherein:

Fig. 1 is an isometric view of the apparatus, the sensing unit, the control unit and a partial wiring diagram being shown schematically therein;

Fig. 2 is a fragmentary top plan view of a tubular article illustrating the possible twist of the seam in one direction;

Fig. 3 is a fragmentary top plan view of a tubular article illustrating the possible twist of the seam in the opposite direction;

Fig. 8 is a side elevational view of a line of units in a tube or sheath forming machine embodying the invention.

Figure 4:
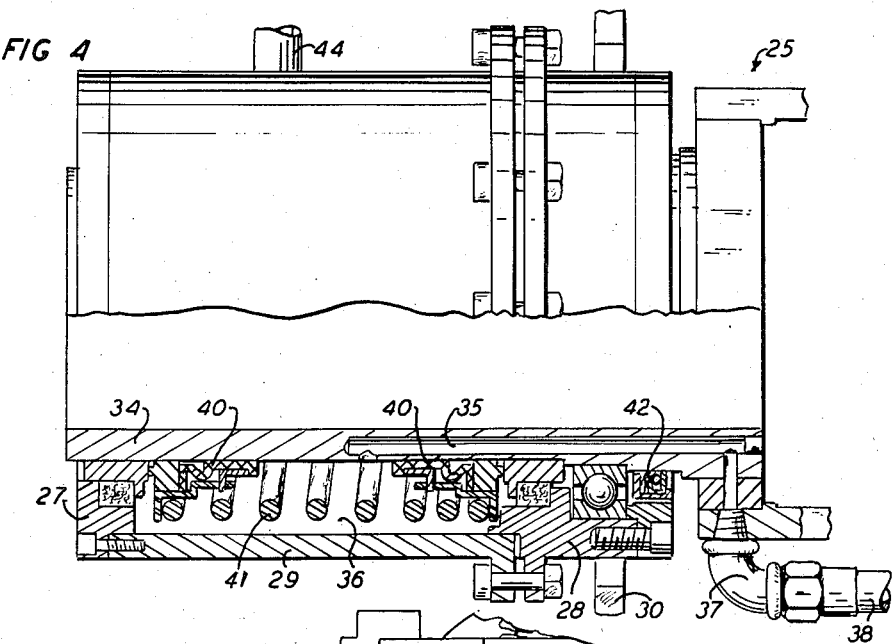
Fig. 4 is a fragmentary partial sectional view of one end of the apparatus.

Referring now to the drawings, attention is first directed to Fig. 1 which illustrates the complete straightening apparatus disposed substantially concentric with the path of a tubular article which in the present instance, is a sheath 10 on a cable core. The sheath 10 is formed about the core as they advance through unit 1, Fig. 8 (E. W. Reynolds-H. C. Slechta Patent 2,764,214), so as to produce a seam of overlapping longitudinal edges. Fig. 8 illustrates a capstan drive 2 for advancing the sheathed core, a driven takeup reel 3 and a distributor 4 for the sheathed core. As disclosed in the aforementioned applications, the tubular article or sheath 10, when disposed on a cable core, has circumferential corrugations which must interfit or match at the seam so that satisfactory soldering or welding operations may be performed. A sensing unit 11 is placed adjacent the soldering unit 5 in advance of the straightening apparatus 6 so that any deviation of the seam 12 from the desired straight line will cause a control unit 14 to operate and control a valve 15 so that fluid from a supply line 16 may be allowed to enter a head 17 under a predetermined variable pressure to actuate a plunger 18 of a fluid cylinder 19 to force sets of rollers 20 and 21 into gripping engagement with the article 10. The sensing unit 11 may be of any desired type which is responsive to deviations in the seam 12 from a straight line at a given position and to selectively operate electrical circuits to cause the proper function of the control unit. One type of sensing unit is disclosed in the aforementioned Hallam-Reynolds co-pending application and includes toothed wheels positioned to ride in corrugations of the adjacent overlapping edges forming the seam 12, the wheels being fixed to ends of a horizontal shaft, supported by a vertical spindle carrying a cam to actuate either one of two switches in circuits to the control unit, depending on the direction of bend starting in the seam 12. If the sheath is not corrugated, the wheels of the sensing unit may be without teeth but of the non-sliding friction type. The control unit 14 may be of any commercially known type but preferably of the type shown in the aforementioned co-pending Ewaldson-Hallam-Slechta application. The control unit, depending upon the function of the sensing unit 11, will drive a reversible motor 23 in a given direction to drive a speed reducing unit 24 so as to rotate a carriage 25, which supports the sets of rollers and the actuating means therefor, in a direction opposing the direction of twist in the article 10 to straighten the article and align all portions of its seam.

The head 17 is cylindrical in general contour, formed of an outer bearing member 27, an inner bearing member 28 and a central cylindrical member 29 secured together (as shown in Fig. 4) and supported by a bracket 30 on a frame 31. A hollow spindle 34 of the carriage 25 is rotatably supported in the head and is provided with a passageway 35 which communicates at one end with a fluid compartment 36 in the head and at the other end with a connection 37 for a fluid line 38. Suitable sealing units 40 assisted by a spring 41 provides fluid-tight connections between the members of the head and the hollow spindle. Additional sealing means for the inner member 28 is shown at 42. A stationary fluid line 44 connects the valve 15 to the fluid compartment 36 of the head 17.

Figure 7:
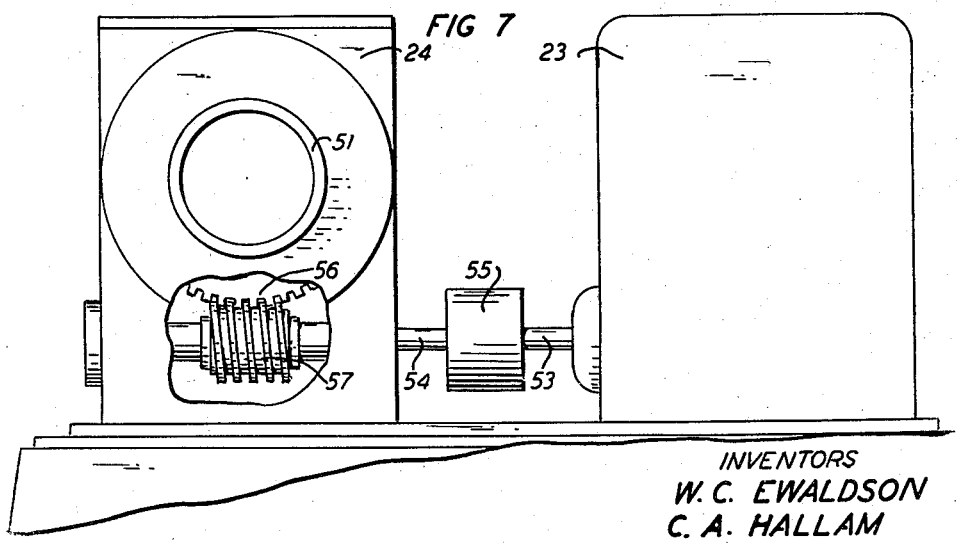
Fig. 7 is a fragmentary and elevational view of the driving means for the carriage.

The carriage 25 is substantially rectangular in general contour including the spindle 34 with an enlarged inner end 46 to which side members 47 and 48 are secured. A similar enlarged head 50 for a hollow spindle 51 (Fig. 7) supports the other ends of the members 47 and 48. The hollow spindle 51 extends through the speed reducing unit 24 and has the output of this unit connected thereto. Attention is directed to Fig. 7 which illustrates the motor 23 having its shaft 53 connected to the input shaft 54 of the speed reducing unit 24 through a suitable coupling or connecting means 55. The driving means for the hollow spindle 51 is a worm gear 56 driven by a worm 57 on the shaft 54.

Figure 5:
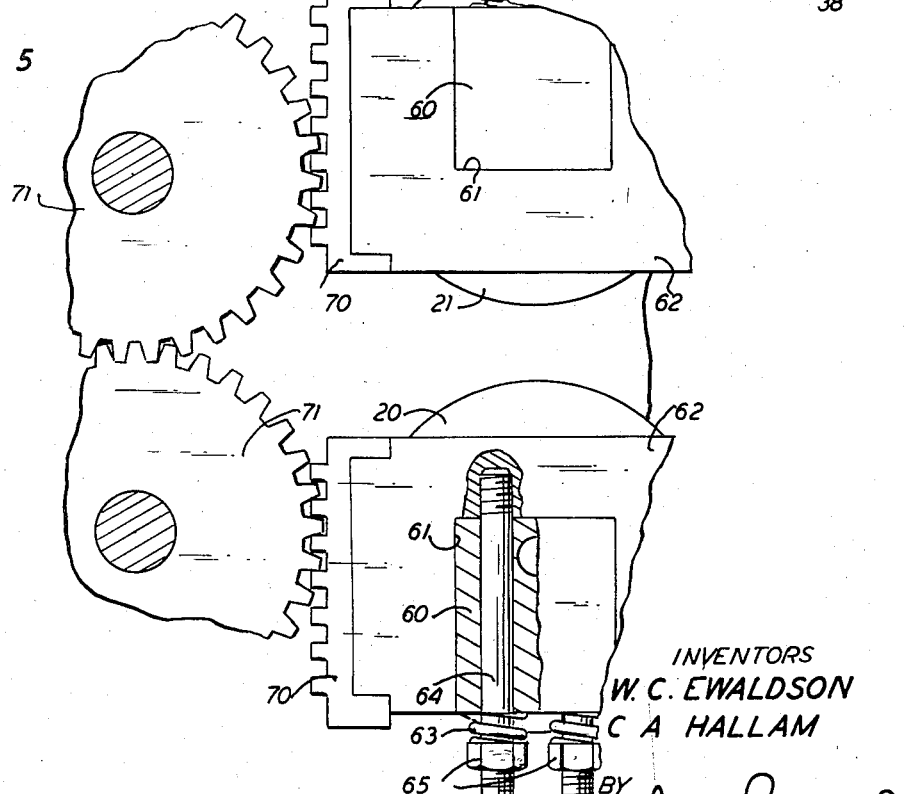
Fig. 5 is an enlarged fragmentary sectional view illustrating a portion of the actuating means for the rollers.
Figure 6:
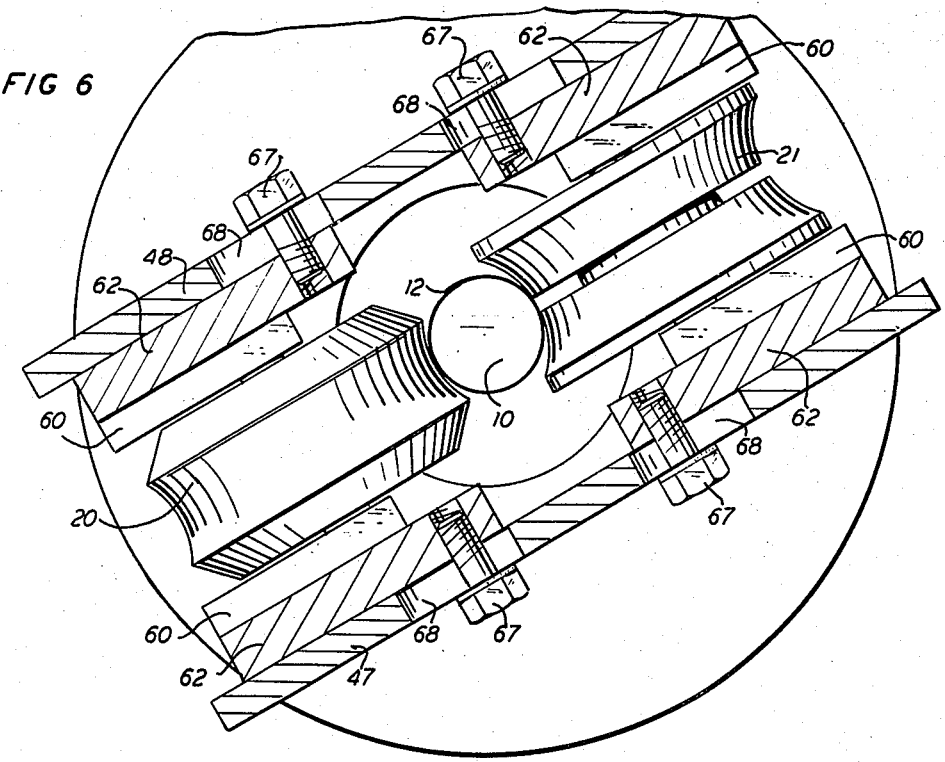
Fig. 6 is a vertical sectional view of the rotatable carriage and the sheathed core.

In the present embodiment of the invention, there are two series of rollers 20 and 21 which are substantially identical in that they partially conform to tubes or cables of various sizes and are resilient in nature to further conform to the tubes when pressure is applied to move the rollers toward the tubes. Each roller in each series or group is provided with a spindle, the ends of which are journalled in bearing blocks 60 normally seated in recesses 61 of parallel holders 62 through the forces of springs 63 mounted on studs 64 extending through apertures in the bearing blocks and threadedly mounted in their respective holders. The forces of the springs 63 to maintain the bearing blocks in their recesses may be varied but adjustable by the nuts 65 on the studs 64. It will be noted that with each series of rollers, there is a pair of holders 62 disposed in their respective positions upon each side of the path of the tubular article 10 and held against displacement by series of screws 67 (Figs. 1 and 6) carried by the holders and extending through elongate apertures 68 in the members 47 and 48. Racks 70 are mounted on the ends of the holders 62, each rack interengaging its respective pinion 71. The pinions 71 are fixedly mounted in pairs on spindles 72 so that driving action of the pinions will be simultaneous. By viewing Fig. 5, it will be apparent that the adjacent pairs of pinions 71 interengage each other providing, therefore, a positive driving connection between the four pinions at each end of the carriage 25. In this manner, by connecting the power means 19 to one of the spindles 72 of each pair in the manner shown, the two pairs of pinions will be operated simultaneously to move the series of rollers toward each other like distances and at like speeds to bring them simultaneously into engagement with the tube or sheathed core. The fluid line 38 (shown in Figs. 1 and 4), extends from the passageway 35 in the hollow spindle 34 to the right end of the cylinder 19, which is pivotally supported at 75 on the carriage 25. The piston rod or ram of the fluid cylinder 19 is connected at 76 to a lever 77 which is fixed at 78 to the adjacent spindle 72. A lever 79 fixed to the adjacent spindle 72 is connected to the lever 77 through the aid of a connecting rod 80 which extends through an apertured bracket 81 on the carriage 25 and is normally urged to the right through the variable force of a spring 82 which is sufficient to actuate the spindles 72 and the pinions 71 to normally hold the rollers away from the path of the tube 10.

Considering now the operation of the apparatus, let it be assumed that the tubular article 10 in travelling longitudinally, is tending to twist (as illustrated in Fig. 2) in a clockwise direction facing the direction of travel. The moment this twist is registered by the sensing unit 11, the control unit 14 starts two things happening: first, the opening of the valve 15 to cause a predetermined variable pressure of the fluid to build up in the cylinder 19 by controlling the fluid under pressure entering the compartment 36, in the head 17, and passing through the passageway 35 of the rotating hollow spindle 34 and line 38 to the cylinder 19; and second, in timed relation with the action of the valve 15, to set in motion the means actuated by the fluid cylinder 19, the proper circuits have been closed to drive the motor 23 in a direction to drive the speed reducing unit 24 and rotate the carriage 25 in a direction opposing the twist in the article 10. Therefore, as fluid pressure is supplied to the cylinder 19, the lever 77 is rotated clockwise, rotating the lever 79 counterclockwise to simultaneously actuate all the pinions 71 and spindles 72 and their racks 70 to move the series of rollers simultaneously toward the path of the tube or sheathed core applying increasing pressure during the simultaneous rotation of the carriage to twist the sheath or tube to straighten the seam thereof without interfering with the longitudinal advancement thereof. As soon as this has been accomplished and the sensing unit has returned to its normal position, the pressure on the rollers may be held constant or reduced, depending on the result of the tendency of the tube to continue to twist or remain straight. If the tube tends to remain straight without assistance of the straightening apparatus, the valve 15 will be closed and the spring 82 will be allowed to function to return the moving means for the series of rollers to their normal positions, thus moving the rollers free of the tube. The variable forces applied to the rollers through the single power means 19 depending upon the desired grip of the rollers on the tube may cause individual compression of the spring 63 associated with the bearing blocks 60. This feature is also important regarding the movement of any irregular portion of a tube or sheathed core through the apparatus allowing the rollers to move outwardly individually to permit the longitudinal escapement of this oversized portion through the apparatus. The same may be said regarding a reduced portion wherein the compressed springs 63 will allow their respective rollers to move into any depression of the tubular article. In actual practice certain conditions, such as winding the tube (or sheathed core) in one direction on a takeup reel or applying force in one direction to distribute the tube on a takeup reel, may create a tendency for the tube to twist continuously in one direction, and a reversal of the direction of takeup and/or distribution may create a tendency for the tube to twist continuously in another direction. If conditions cause a continuous twist in the tube in one direction, the straightening apparatus will rotate continuously in an opposing direction to maintain the seam straight. Any tendency for the apparatus to overdrive, discontinuance of the tendency to twist in one direction and/or the starting of the tube to twist in the reverse direction will first cause reduction of the pressure on the rollers during continuous rotation of the carriage. If this is not sufficient to create a balance, indicated by a straight seam, the motor will be reversed to drive the carriage continuously in a reverse direction, during which time the pressure on the rollers will be increased to a given value.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with an apparatus for fusion bonding a metal seam, composed of portions adjacent side edges of a strip of metal bent longitudinally into a tubular article, the apparatus having a bonding unit mounted at a fixed position, means to advance the article longitudinally to move the seam relative to the bonding unit to bond the seam, and a sensing unit disposed adjacent the bonding unit and actuated in either direction by deflection of the seam in either direction from a straight line relative to the bonding unit, of a straightening unit disposed adjacent the bonding unit and including rollers disposed at opposing sides of the centerline of the article, bearings to rotatably support the rollers, a rotatable carriage disposed adjacent the rollers, elements to support the bearings mounted in the carriage for movement relative to the carriage and the centerline of the article, means responsive to the sensing unit to rotate the carriage with the elements and rollers about the article in a direction opposite the direction of any twist in the seam, and means responsive to the sensing unit to move the elements to force the rollers into gripping engagement with the article to move the article about its centerline to remove the twist from the article and maintain the seam in registration with the bonding unit.

2. The combination with an apparatus for fusion bonding a metal seam, composed of portions adjacent side edges of a strip of metal bent longitudinally into a tubular article, the apparatus having a bonding unit mounted at a fixed position, means to advance the article longitudinally to move the seam relative to the bonding unit to bond the seam, and a sensing unit disposed adjacent the bonding unit and actuated in either direction by deflection of the seam in either direction from a straight line relative to the bonding unit, of a straightening unit disposed adjacent the sealing unit and including rollers disposed at opposing sides of the centerline of the article, bearings to rotatably support the rollers, a rotatable carriage disposed adjacent the rollers, elements to support the bearings mounted in the carriage for movement relative to the carriage and the centerline of the article, means responsive to the sensing unit to rotate the carriage with the elements and rollers about the article in a direction opposite the direction of any twist in the seam, means responsive to the sensing unit to move the elements to force the rollers into gripping engagement with the article to move the article about its centerline to remove the twist from the article and maintain the seam in registration with the bonding unit, and resilient means normally urging the bearing of each roller to follow the movement of its element and permitting lateral movement of any roller relative to its element by irregularities in the cross-sectional contour of the article.

3. The combination with an apparatus for fusion bonding a scam, composed of portions adjacent side edges of a strip of metal bent longitudinally into a tubular article, the apparatus having a bonding unit mounted at a fixed position, means to advance the article longitudinally to move the seam relative to the bonding unit to bond the seam, and a sensing unit disposed adjacent the bonding unit and actuated in either direction by deflection of the seam in either direction from a straight line relative to the bonding unit, of a straightening unit disposed adjacent the bonding unit and including rollers disposed at opposing sides of the centerline of the article, bearings to rotatably support the rollers, a rotatable carriage disposed adjacent the rollers, elements to support the bearings mounted in the carriage for movement relative to the carriage and the centerline of the article, means responsive to the sensing unit to rotate the carriage with the elements and rollers about the article in a direction opposite the direction of any twist in the seam, means responsive to the sensing unit to move the elements to force the rollers into gripping engagement with the article to move the article about its centerline to remove the twist from the article and maintain the seam in registration with the bonding unit, and resilient cushioning means for the bearing of each roller carried by its element and compressible during movement of the elements to force the rollers into gripping engagement with the article to adapt the bearings for movement of their rollers in either direction toward or away from the centerline in following irregularities in the cross-sectional contours of the article.

4. The combination with an apparatus for fusion bonding a seam, composed of portions adjacent side edges of a strip of metal bent longitudinally into a tubular article, the apparatus having a bonding unit mounted at a fixed position, means to advance the article longitudinally to move the seam relative to the bonding unit to bond the seam, and a sensing unit disposed adjacent the bonding unit and actuated in either direction by deflection of the seam in either direction from a straight line relative to the bonding unit, of a straightening unit disposed adjacent the bonding unit and including two rows of rollers disposed upon opposing sides of the centerline of the article, bearings to rotatably support the rollers, a rotatable carriage disposed adjacent the rollers, parallel elongate elements for the bearings of the rows of rollers supported by the carriage for lateral movement relative to the centerline of the article in the carriage, means responsive to the sensing unit to rotate the carriage with the elements and rollers about the article in a direction opposite the direction of any twist in the seam, and means responsive to the sensing unit to move the elements to force the rollers into gripping engagement with the article to move the article about its centerline to remove the twist from the article and maintain the seam in registration with the bonding unit.

5. The combination with an apparatus for fusion bonding a seam composed of portions adjacent side edges of a strip of metal bent longitudinally into a tubular article, the apparatus having a bonding unit mounted at a fixed position, means to advance the article longitudinally to move the seam relative to the bonding unit to bond the seam, and a sensing unit disposed adjacent the bonding unit and actuated in either direction by deflection of the seam in either direction from a straight line relative to the bonding unit, of a straightening unit disposed adjacent the bonding unit and including two rows of rollers disposed upon opposing sides of the centerline of the article, bearings to rotatably support the rollers, a rotatable carriage disposed adjacent the rollers, parallel elongate elements for the bearings of the rows of rollers supported by the carriage for lateral movement relative to the centerline of the article in the carriage, means responsive to the sensing unit to rotate the carriage with the elements and rollers about the article in a direction opposite the direction of any twist in the seam, and a single power means operatively connected to the ends of the elements and responsive to the sensing unit to apply like forces to move the elements laterally simultaneously to force the rows of rollers into gripping engagement with the article to render the carriage effective to move the article about its centerline to remove the twist from the article and maintain the seam in registration with the bonding unit.

6. The combination with an apparatus for fusion bonding a seam, composed of overlapping side edges of a strip of metal bent longitudinally into a tubular article forming a metal sheath about a cable core, the apparatus having a bonding unit mounted at a fixed position, means to advance the article longitudinally to move the seam relative to the bonding unit to bond the seam, and a sensing unit disposed adjacent the sealing unit and actuated in either direction by deflection of the seam in either direction from a straight line relative to the bonding unit, of a straightening unit disposed adjacent the bonding unit and including rollers disposed at opposing sides of the centerline of the article, bearings to rotatably support the rollers, a rotatable carriage disposed adjacent the rollers, elements to support the bearings mounted in the carriage for movement relative to the carriage and the centerline of the article, means responsive to the sensing unit to rotate the carriage with the elements and rollers about the article in a direction opposite the direction of any twist in the seam, and means responsive to the sensing unit to move the elements to force the rollers into gripping engagement with the article to move the article about its centerline to remove the twist from the article and maintain the seam in registration with the bonding unit.

7. The combination with an apparatus for fusion bonding a seam, composed of overlapping side edges of a strip of metal bent longitudinally into a tubular article forming a metal sheath about a cable core, the apparatus having a bonding unit mounted at a fixed position, means to advance the article longitudinally to move the seam relative to the bonding unit to bond the seam, and a sensing unit disposed adjacent the bonding unit and actuated in either direction by deflection of the seam in either direction from a straight line relative to the bonding unit, of a straightening unit disposed adjacent the bonding unit and including rollers disposed at opposing sides of the centerline of the article, bearings to rotatably support the rollers, a rotatable carriage disposed adjacent the rollers, elements to support the bearings mounted in the carriage for movement relative to the carriage and the centerline of the article, means responsive to the sensing unit to rotate the carriage with the elements and rollers about the article in a direction opposite the direction of any twist in the seam, means responsive to the sensing unit to move the elements to force the rollers into gripping engagement with the article to move the article about its centerline to remove the twist from the article and maintain the seam in registration with the bonding unit, and resilient cushioning means for the bearing of each roller carried by its element and compressible during movement of the elements to force the rollers into gripping engagement with the article to adapt the bearings for movement of their rollers in either direction toward or away from the center line in following irregularities in the cross-sectional contours of the article.

8. The combination with an apparatus for fusion bonding a seam, composed of overlapping side edges of a strip of metal bent longitudinally into a tubular article forming a metal sheath about a cable core, the apparatus having a bonding unit mounted at a fixed position, means to advance the article longitudinally to move the seam relative to the bonding unit to bond the seam, a sensing unit disposed adjacent the bonding unit and actuated in either direction by deflection of the seam in either direction from a straight line relative to the bonding unit, of a straightening unit disposed adjacent the sealing unit and including two rows of rollers disposed upon opposing sides of the centerline of the article, bearings to rotatably support the rollers, a rotatable carriage disposed adjacent the rollers, parallel elongate elements for the bearings of the rows of rollers supported by the carriage for lateral movement relative to the centerline of the article in the carriage, means responsive to the sensing unit to rotate the carriage with the elements and rollers about the article in a direction opposite the direction of any twist in the seam, and means responsive to the sensing unit to move the elements to force the rollers into gripping engagement with the article to move the article about its centerline to remove the twist from the article and maintain the seam in registration with the bonding unit.

References Cited in the file of this patent
UNITED STATES PATENTS

| | | |
|---|---|---|
| 1,997,272 | Adams | Apr. 9, 1935 |
| 2,130,586 | Huston | Sept. 20, 1938 |
| 2,268,368 | Anderson | Dec. 30, 1941 |
| 2,499,853 | Eckel et al. | Mar. 7, 1950 |
| 2,526,723 | Berkeley | Oct. 24, 1950 |
| 2,557,046 | Evans | June 12, 1951 |
| 2,582,963 | Cachat | Jan. 22, 1952 |